(12) United States Patent
Mehdi et al.

(10) Patent No.: US 11,571,622 B2
(45) Date of Patent: Feb. 7, 2023

(54) IN-VEHICLE GAMING SYSTEMS AND METHODS

(71) Applicant: GM GLOBAL TECHNOLOGY OPERATIONS LLC, Detroit, MI (US)

(72) Inventors: Syed B. Mehdi, Southfield, MI (US); Ke Liu, Ypsilanti, MI (US); Louis G. Hector, Jr., Shelby Township, MI (US); Wei Zeng, Oakland Township, MI (US); Jeremie Dernotte, Rochester, MI (US); Nicole Ellison, Madison Heights, MI (US); Kevin J. Silang, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/991,092

(22) Filed: Aug. 12, 2020

(65) Prior Publication Data
US 2022/0047951 A1 Feb. 17, 2022

(51) Int. Cl.
*A63F 13/65* (2014.01)
*A63F 13/216* (2014.01)
(Continued)

(52) U.S. Cl.
CPC ............ *A63F 13/65* (2014.09); *A63F 13/213* (2014.09); *A63F 13/216* (2014.09);
(Continued)

(58) Field of Classification Search
CPC ........ A63F 13/28; A63F 13/65; A63F 13/213; A63F 13/216; A63F 13/217; A63F 13/803; A63F 2300/5553; A63F 2300/8082
See application file for complete search history.

(56) References Cited

U.S. PATENT DOCUMENTS

| | | | |
|---|---|---|---|
| 6,401,033 B1 * | 6/2002 | Paulauskas | A63F 13/10 701/410 |
| 7,537,522 B2 * | 5/2009 | Plavetich | A63F 13/00 463/36 |

(Continued)

OTHER PUBLICATIONS

"Honda Dream Drive—hands on with a prototype for car infotainment," by Dean Takahashi, published Feb. 10, 2019 Source: https://venturebeat.com/2019/02/10/honda-dream-drive-hands-on-with-a-prototype-for-car-infotainment/ (Year: 2019).*

(Continued)

*Primary Examiner* — Steven J Hylinski

(57) ABSTRACT

A gaming system of a vehicle includes: a game application embodying an interactive game and stored in memory; a sensor of a vehicle configured to determine a present condition while the vehicle is moving; a gaming module of the vehicle, the gaming module configured to, while the vehicle is moving: execute the game application; display a virtual environment of the interactive game via one or more displays in the vehicle; output sound of the interactive game via one or more speakers in the vehicle; control action within the virtual environment of the interactive game based on user input received via one or more input devices of the vehicle; and adjust one or more characteristics of the virtual environment of the interactive game based on the present condition.

18 Claims, 10 Drawing Sheets

(51) Int. Cl.
*A63F 13/217* (2014.01)
*A63F 13/28* (2014.01)
*A63F 13/803* (2014.01)
*A63F 13/213* (2014.01)

(52) U.S. Cl.
CPC ............ *A63F 13/217* (2014.09); *A63F 13/28* (2014.09); *A63F 13/803* (2014.09); *A63F 2300/5553* (2013.01); *A63F 2300/8082* (2013.01)

(56) References Cited

U.S. PATENT DOCUMENTS

| | | | | |
|---|---|---|---|---|
| 8,366,554 | B1* | 2/2013 | Yuan | A63F 13/211 463/42 |
| 8,968,092 | B2* | 3/2015 | Gomez | G07F 17/32 463/31 |
| 9,143,897 | B2* | 9/2015 | Kuramura | G01C 21/3697 |
| 9,536,353 | B2* | 1/2017 | Alaniz | H04N 13/117 |
| 9,547,173 | B2* | 1/2017 | Alaniz | G02B 27/017 |
| 9,621,941 | B2* | 4/2017 | Lemmey | H04N 21/414 |
| 10,205,890 | B2* | 2/2019 | Feldman | H04S 7/302 |
| 10,625,676 | B1* | 4/2020 | Tsimhoni | A63F 13/25 |
| 10,638,106 | B2* | 4/2020 | Alaniz | H04N 13/117 |
| 10,969,748 | B1* | 4/2021 | Goslin | G05B 13/0205 |
| 10,970,560 | B2* | 4/2021 | Khalfan | G06K 9/00832 |
| 2006/0009289 | A1* | 1/2006 | McCarten | A63F 13/12 463/42 |
| 2007/0142108 | A1* | 6/2007 | Linard | A63F 9/18 463/22 |
| 2011/0106375 | A1* | 5/2011 | Gurusamy Sundaram | H04W 4/60 701/31.4 |
| 2012/0231886 | A1* | 9/2012 | Gomez | G07F 17/3206 463/32 |
| 2013/0083061 | A1* | 4/2013 | Mishra | A63F 13/213 345/633 |
| 2013/0165233 | A1* | 6/2013 | Wada | A63F 13/35 463/42 |
| 2014/0128144 | A1* | 5/2014 | Bavitz | A63F 13/65 463/23 |
| 2014/0129130 | A1* | 5/2014 | Kuramura | G01C 21/00 701/400 |
| 2014/0267230 | A1* | 9/2014 | Osuna | A63F 13/58 345/419 |
| 2015/0097860 | A1* | 4/2015 | Alaniz | G02B 27/017 345/633 |
| 2015/0097863 | A1* | 4/2015 | Alaniz | G06T 19/006 345/633 |
| 2017/0291600 | A1* | 10/2017 | Styles | G07C 5/0825 |
| 2017/0352267 | A1* | 12/2017 | Tzirkel-Hancock | B60K 35/00 |
| 2018/0027189 | A1* | 1/2018 | Feldman | H04S 7/302 348/468 |
| 2019/0163265 | A1* | 5/2019 | Alaniz | G06F 3/011 |
| 2020/0197791 | A1* | 6/2020 | Iwasaki | A63F 13/213 |
| 2020/0264703 | A1* | 8/2020 | Leake | G06F 3/016 |

OTHER PUBLICATIONS https://www.youtube.com/watch?v=-SoZKXIsJG8; Published Jun. 18, 2019; 1 page.
https://www.diqitaltrends.com/cars/tesla-has-a-new-wav-to-keep-vou-entertained-while-you-charge-your-car/; Jun. 20, 2019; 15 pages.
https://www.motor1.com/news/307721/mercedes-cla-mbux-mario-kart/; Mar. 4, 2019; 3 pages.

* cited by examiner

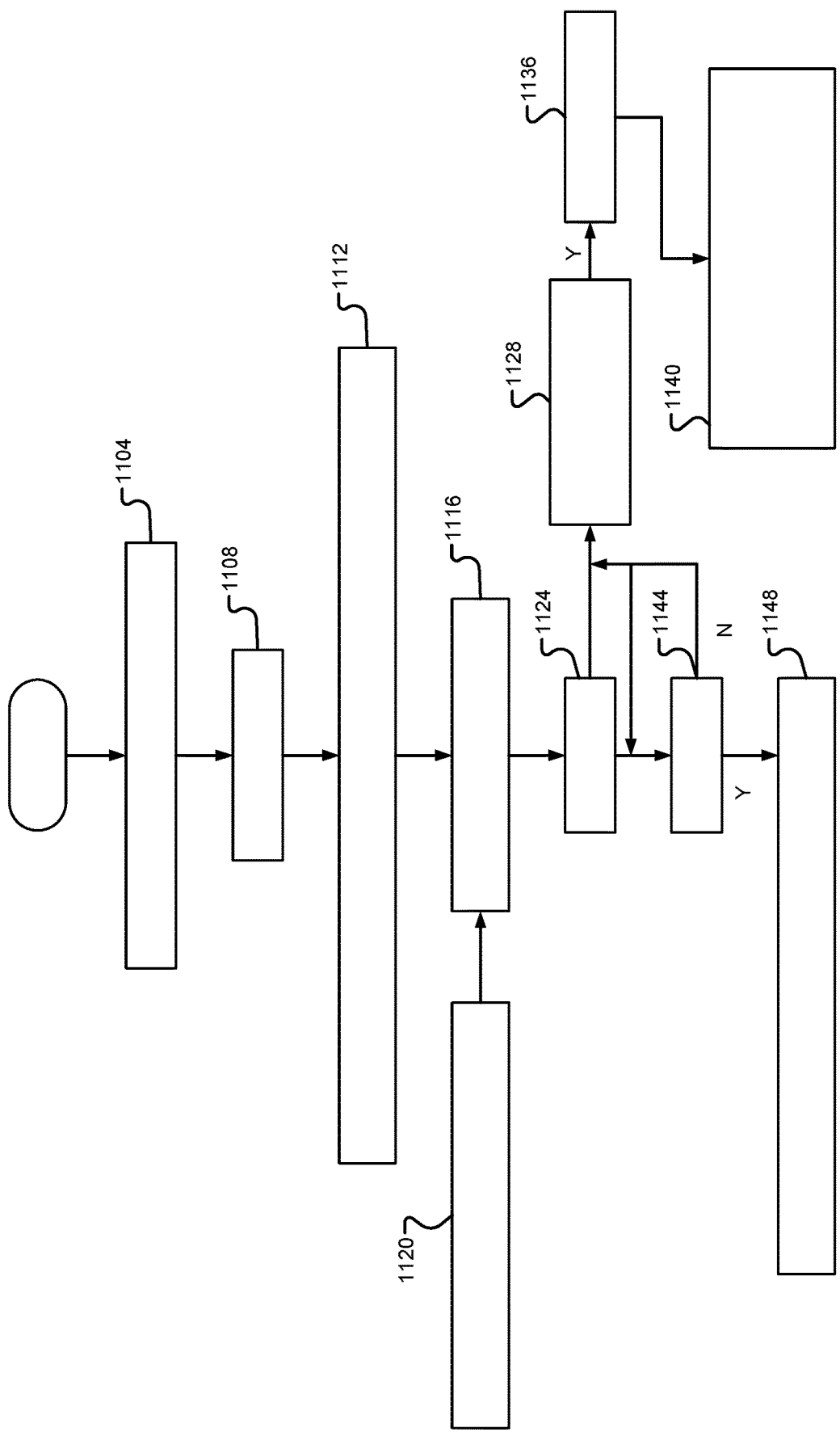

IN-VEHICLE GAMING SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to systems and methods for in-vehicle gaming.

Vehicles include one or more torque producing devices, such as an internal combustion engine and/or an electric motor. A passenger of a vehicle rides within a passenger cabin (or passenger compartment) of the vehicle.

Vehicles may include one or more different type of sensors that sense vehicle surroundings. One example of a sensor that senses vehicle surroundings is a camera configured to capture images of the vehicle surroundings. Examples of such cameras include forward facing cameras, rear facing cameras, and side facing cameras. Another example of a sensor that senses vehicle surroundings includes a radar sensor configured to capture information regarding vehicle surroundings. Other examples of sensors that sense vehicle surroundings include sonar sensors and light detection and ranging (LIDAR) sensors configured to capture information regarding vehicle surroundings.

SUMMARY

In a feature, a gaming system of a vehicle includes: a game application embodying an interactive game and stored in memory; a sensor of a vehicle configured to determine a present condition while the vehicle is moving; a gaming module of the vehicle, the gaming module configured to, while the vehicle is moving: execute the game application; display a virtual environment of the interactive game via one or more displays in the vehicle; output sound of the interactive game via one or more speakers in the vehicle; control action within the virtual environment of the interactive game based on user input received via one or more input devices of the vehicle; and adjust one or more characteristics of the virtual environment of the interactive game based on the present condition.

In further features, the sensor includes a global positioning system (GPS) module of the vehicle configured to determine a present location of the vehicle, where the gaming module is configured to, while the vehicle is moving, adjust the virtual environment of the interactive game based on the present location of the vehicle.

In further features, the gaming module is configured to move an avatar through the virtual environment of the interactive game based on a predetermined scalar value multiplied by a velocity of the vehicle.

In further features, the predetermined scalar value is greater than 1.

In further features, a weather module is configured to obtain weather data indicative of weather conditions at the vehicle based on the present location of the vehicle, and the gaming module is configured to adjust weather in the virtual environment of the interactive game based on the weather data indicative of weather conditions at the vehicle.

In further features, the weather module is configured to obtain the weather data from a remote weather source via a network.

In further features, a heating, ventilation, and air conditioning (HVAC) system is configured to control heating and cooling of a passenger cabin of the vehicle, and the gaming module is further configured to, based on a wind speed of the weather data, at least one of: adjust a speed of a blower of the HVAC system based on a wind speed of the weather data; and adjust one or more characteristics of the virtual environment of the interactive game based on the wind speed of the weather data.

In further features, the gaming module is configured to increase a speed of the blower of the HVAC system when the wind speed is greater than a predetermined speed.

In further features: the sensor is configured to measure a jerk of the vehicle; and the gaming module is configured to adjust one or more characteristics of the virtual environment of the interactive game based on the jerk of the vehicle.

In further features, the gaming module is configured to shake one or more items of the virtual environment in response to a determination that the jerk of the vehicle is greater than a predetermined jerk.

In further features: the sensor is configured to measure an ambient temperature outside of the vehicle; and the gaming module is configured to adjust one or more characteristics of the virtual environment of the interactive game based on the ambient temperature outside of the vehicle.

In further features, the gaming module is configured to adjust at least one light characteristic within the virtual environment in response to a determination that the ambient temperature outside of the vehicle is greater than a predetermined temperature.

In further features, the gaming module is configured to cause one or more items to visibly melt in the virtual environment in response to a determination that the ambient temperature outside of the vehicle is greater than a predetermined temperature.

In further features, the gaming module is configured to cause one or more items to visibly transition to a frozen state in the virtual environment in response to a determination that the ambient temperature outside of the vehicle is less than a predetermined temperature.

In further features: the sensor is configured to capture an image of an environment outside of the vehicle; and the gaming module is configured to adjust one or more characteristics of the virtual environment based on the image of the environment outside of the vehicle.

In a feature, a gaming system of a vehicle includes: a game application embodying an interactive game and stored in memory; a gaming module of the vehicle, the gaming module configured to, in response to a determination that the vehicle is stopped and parked: execute the game application; display a virtual environment of the interactive game via a display in the vehicle; and control action within the virtual environment of the interactive game based on input received via at least one of: a steering wheel of the vehicle; a horn input device of the vehicle; an accelerator pedal of the vehicle; and a brake pedal of the vehicle.

In further features, the gaming module is configured to, in response to the determination that the vehicle is stopped and parked, control action within the virtual environment of the interactive game based on input received via all of: the steering wheel of the vehicle; the horn input device of the vehicle; the accelerator pedal of the vehicle; and the brake pedal of the vehicle.

In further features, the gaming module is configured to, in response to the determination that the vehicle is stopped and parked, at least one of: move an avatar left and right within the virtual environment of the interactive game in response to turning of the steering wheel of the vehicle left and right, respectively; and move the avatar upwardly and downwardly within the virtual environment of the interactive game in response to turning of the steering wheel.

In further features, the gaming module is configured to, in response to the determination that the vehicle is stopped and parked, accelerate movement of an avatar in the virtual environment of the interactive game in response to actuation of the accelerator pedal of the vehicle.

In further features, the gaming module is configured to, in response to the determination that the vehicle is stopped and parked, decelerate movement of an avatar in the virtual environment of the interactive game in response to actuation of the brake pedal of the vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 10 includes a flowchart depicting an example method of controlling play of a game 308 while the vehicle is parked.

In the drawings, reference numbers may be reused to identify similar and/or identical elements.

DETAILED DESCRIPTION

A vehicle may include a gaming system that allows one or more users of the vehicle to play games in the vehicle. The gaming system may control action within a game using one or more game controllers.

The present application involves a gaming system of a vehicle that controls a virtual environment within a game based on one or more conditions of the vehicle while the vehicle moves. For example, the gaming system may make one or more items shake within the virtual environment when the vehicle shakes, such as in response to hitting a pothole. Additionally or alternatively, the gaming system may display rain within the virtual environment when rain is present at the location of the vehicle. Additionally or alternatively, the gaming system may cause one or more items to melt within the virtual environment and/or display a mirage effect within the virtual environment when an ambient temperature at the vehicle is greater than a predetermined temperature. Other examples of how the gaming system can adjust the virtual environment based on conditions at the vehicle are discussed further below.

The gaming system of the vehicle may also allow for gameplay (e.g., via a virtual reality headset) while the vehicle is parked and stopped using one or more input devices of the vehicle, such as a steering wheel of the vehicle, a brake pedal of the vehicle, an accelerator pedal of the vehicle, and a horn input device of the vehicle. While the vehicle is parked and stopped, the gaming system may, for example, generate a honk sound within the virtual environment of the game in response to user actuation of the horn input device. The gaming system may also generate the honk sound within the virtual environment of the game in response to user actuation of the horn input device while the vehicle is moving or a transmission is in drive (e.g., stuck in traffic). Additionally or alternatively, while the vehicle is parked and stopped, the gaming system may turn an avatar left and right within the virtual environment in response to the user turning of the steering wheel left and right, respectively. Additionally or alternatively, while the vehicle is parked and stopped, the gaming system may accelerate the avatar within the virtual environment in response to user actuation of the accelerator pedal. Additionally or alternatively, while the vehicle is parked and stopped, the gaming system may decelerate the avatar within the virtual environment in response to user actuation of the brake pedal. This may allow for use of the vehicle inputs to control gameplay while the vehicle is stopped and parked.

Figure 1:
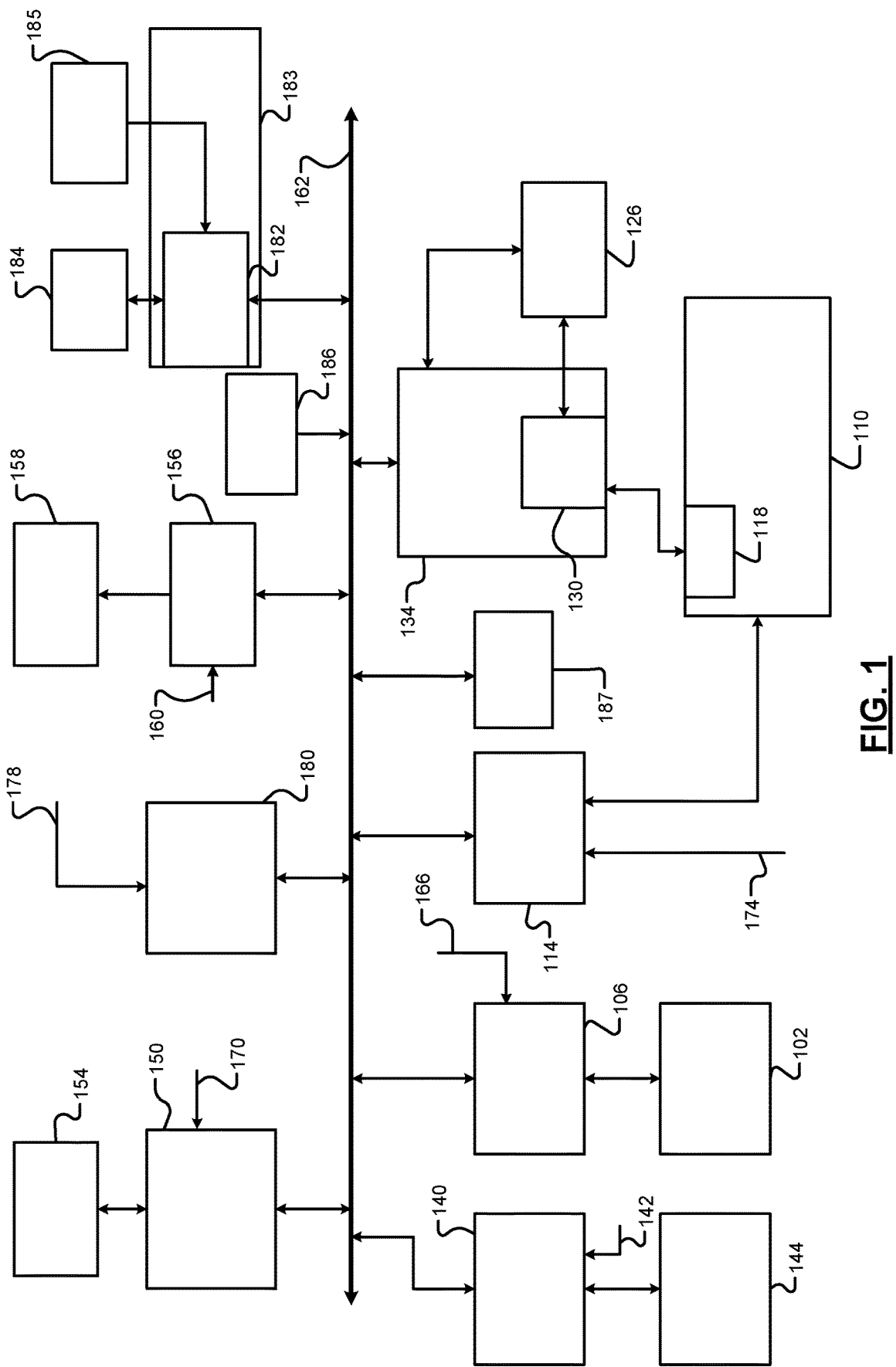
FIG. 1 is a functional block diagram of an example vehicle system.

Referring now to FIG. 1, a functional block diagram of an example vehicle system is presented. While a vehicle system for a hybrid vehicle is shown and will be described, the present application is also applicable to non-hybrid vehicles, electric vehicles, fuel cell vehicles, and other types of vehicles. The present application is applicable to autonomous vehicles, semi-autonomous vehicles, non-autonomous vehicles, shared vehicles, non-shared vehicles, and other types of vehicles.

An engine 102 may combust an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter module (PIM) 134 may control the electric motor 118 and the PCD 130. The PCD 130 applies power from the battery 126 to the electric motor 118 based on signals from the PIM 134, and the PCD 130 provides power output by the electric motor 118, for example, to the battery 126. The PIM 134 may include, for example, an inverter.

A steering control module 140 controls steering/turning of wheels of the vehicle, for example, based on driver turning of a steering wheel within the vehicle and/or steering commands from one or more vehicle control modules. A steering wheel angle (SWA) sensor (not shown) monitors rotational position of the steering wheel and generates a SWA 142 based on the position of the steering wheel. As an example, the steering control module 140 may control vehicle steering via an electronic power steering (EPS) motor 144 based on the SWA 142. However, the vehicle may include another type of steering system.

An electronic brake control module (EBCM) 150 may selectively control brakes 154 of the vehicle. A horn module 156 may apply power to a horn 158 when a horn input 160 is in a first state. The horn 158 outputs sound when power is applied to the horn 158. The horn module 156 may not apply power to the horn 158 when the horn input 160 is in a second state. The horn input 160 may transition from the second state to the first state, for example, in response to user application of at least a predetermined force to a horn input device (e.g., located on the steering wheel). The horn input device may apply a bias force such that the horn input 160 is in the second state when less than the predetermined force is applied to the horn input device.

Modules of the vehicle may share parameters via a controller area network (CAN) 162. The CAN 162 may also be referred to as a car area network. For example, the CAN 162 may include one or more data buses. Various parameters may be made available by a given module to other modules via the CAN 162.

The driver inputs may include, for example, an accelerator pedal position (APP) 166 which may be provided to the ECM 106. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

The vehicle system may also include a gaming module 182. The gaming module 182 may be connected to, be a part of, or include an infotainment module 183 of the vehicle.

The gaming module 182 outputs gaming feedback via one or more output devices 184. The output devices 184 may include, for example, one or more displays, one or more sets of virtual reality (VR) goggles, one or more sets of augmented reality (AR) goggles, one or more other suitable types of video output devices, one or more speakers, one or more haptic devices, and/or one or more other suitable types of output devices. In various implementations, goggles may include one or more video devices and one or more speakers.

The gaming module 182 outputs gaming video via the one or more displays, one or more sets of VR goggles, and/or one or more sets of AR goggles. The gaming module 182 outputs gaming audio via the one or more speakers. The gaming module 182 may also output other gaming feedback via one or more haptic devices. For example, haptic devices may be included with one or more seats, in one or more seat belts, in the steering wheel, etc. Examples of displays may include, for example, one or more displays (e.g., on a front console) of the vehicle, a head up display (HUD) that displays information via a substrate (e.g., windshield), one or more displays that drop downwardly or extend upwardly to form panoramic views, and/or one or more other suitable displays.

The gaming module 182 controls play of one or more games based on user input received via one or more input devices 185, such as one or more gaming controllers, one or more joysticks, etc. Under some circumstances, the gaming module 182 may control gameplay based on input from vehicle components (e.g., the steering wheel, brake and accelerator pedals, horn, etc.), as discussed further below.

The vehicle may include a plurality of external sensors and cameras, generally illustrated in FIG. 1 by 186. One or more actions may be taken based on input from the external sensors and cameras 186. For example, the infotainment module may display video, various views, and/or alerts on a display via input from the external sensors and cameras 186 during driving.

As another example, based on input from the external sensors and cameras 186, a perception module 187 perceives objects around the vehicle and locations of the objects relative to the vehicle. The ECM 106 may adjust torque output of the engine 102 based on input from the perception module 187. Additionally or alternatively, the PIM 134 may control power flow to and/or from the electric motor 118 based on input from the perception module 187. Additionally or alternatively, the EBCM 150 may adjust braking based on input from the perception module 187. Additionally or alternatively, the steering control module 140 may adjust steering based on input from the perception module 187.

The vehicle may include one or more additional control modules that are not shown, such as a chassis control module, a battery pack control module, etc. The vehicle may omit one or more of the control modules shown and discussed.

Figure 2:
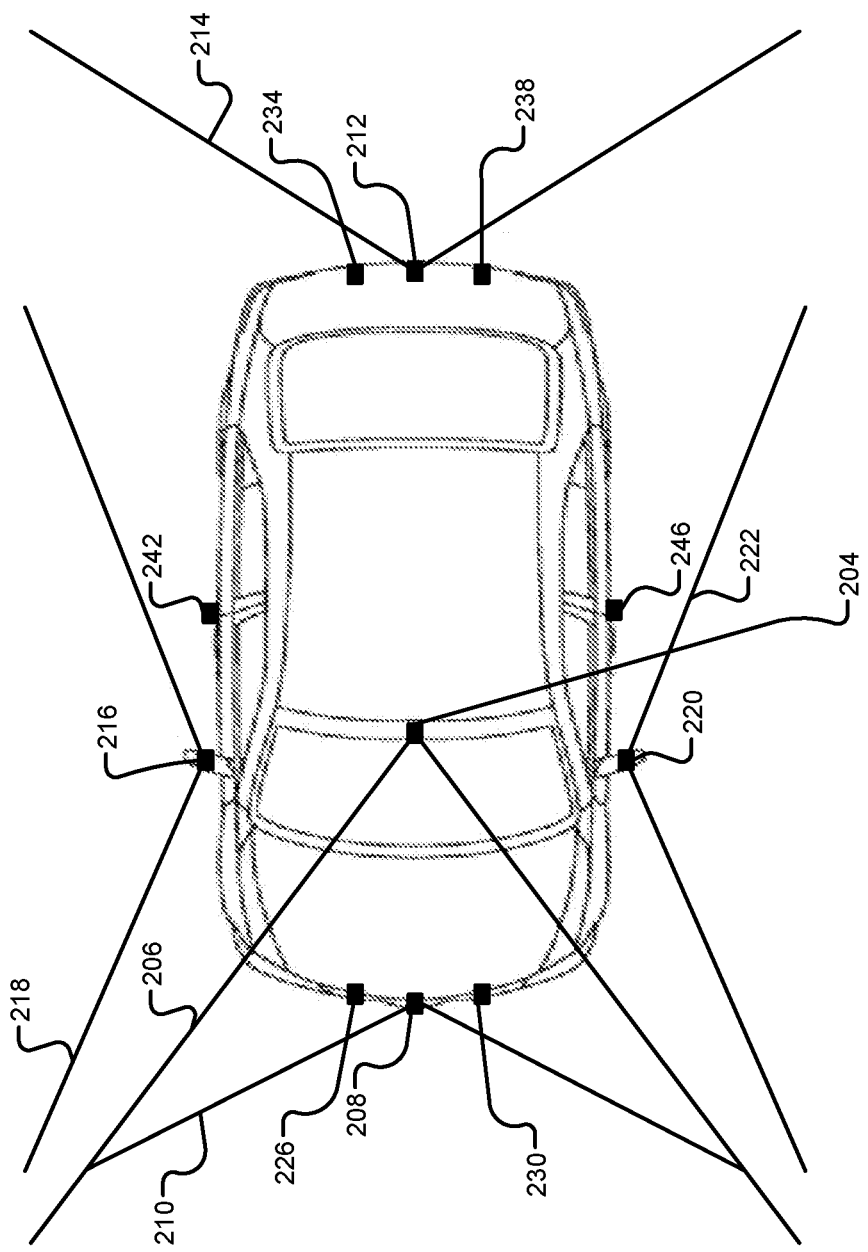
FIG. 2 is a functional block diagram of a vehicle including various external cameras and sensors.

Referring now to FIG. 2, a functional block diagram of a vehicle including examples of external sensors and cameras is presented. The external sensors and cameras 186 (FIG. 1) include various cameras positioned to capture images and video outside of (external to) the vehicle and various types of sensors measuring parameters outside of (external to the vehicle). Examples of the external sensors and cameras 186 will now be discussed. For example, a forward facing camera 204 captures images and video of images within a predetermined field of view (FOV) 206 in front of the vehicle.

A front camera 208 may also capture images and video within a predetermined FOV 210 in front of the vehicle. The front camera 208 may capture images and video within a predetermined distance of the front of the vehicle and may be located at the front of the vehicle (e.g., in a front fascia, grille, or bumper). The forward facing camera 204 may be located more rearward, however, such as with a rear view mirror at a windshield of the vehicle. The forward facing camera 204 may not be able to capture images and video of items within all of or at least a portion of the predetermined FOV of the front camera 208 and may capture images and video more than the predetermined distance of the front of the vehicle. In various implementations, only one of the forward facing camera 204 and the front camera 208 may be included.

A rear camera 212 captures images and video within a predetermined FOV 214 behind the vehicle. The rear camera 212 may be located at the rear of the vehicle, such as near a rear license plate.

A right camera 216 captures images and video within a predetermined FOV 218 to the right of the vehicle. The right camera 216 may capture images and video within a predetermined distance to the right of the vehicle and may be located, for example, under a right side rear view mirror. In various implementations, the right side rear view mirror may be omitted, and the right camera 216 may be located near where the right side rear view mirror would normally be located.

A left camera 220 captures images and video within a predetermined FOV 222 to the left of the vehicle. The left camera 220 may capture images and video within a predetermined distance to the left of the vehicle and may be located, for example, under a left side rear view mirror. In various implementations, the left side rear view mirror may be omitted, and the left camera 220 may be located near where the left side rear view mirror would normally be located. While the example FOVs are shown for illustrative purposes, the FOVs may overlap, for example, for more accurate and/or inclusive stitching.

The external sensors and cameras 186 may additionally or alternatively include various other types of sensors, such as ultrasonic sensors, radar sensors, etc. For example, the vehicle may include one or more forward facing ultrasonic sensors, such as forward facing ultrasonic sensors 226 and 230, one or more rearward facing ultrasonic sensors, such as rearward facing ultrasonic sensors 234 and 238. The vehicle may also include one or more right side ultrasonic sensors, such as right side ultrasonic sensor 242, and one or more left side ultrasonic sensors, such as left side ultrasonic sensor 246. The locations of the cameras and ultrasonic sensors are provided as examples only and different locations could be used. Ultrasonic sensors output ultrasonic signals around the vehicle.

The external sensors and cameras 186 may additionally or alternatively include one or more other types of sensors, such as one or more sonar sensors, one or more radar sensors, and/or one or more light detection and ranging (LIDAR) sensors.

Figure 3:
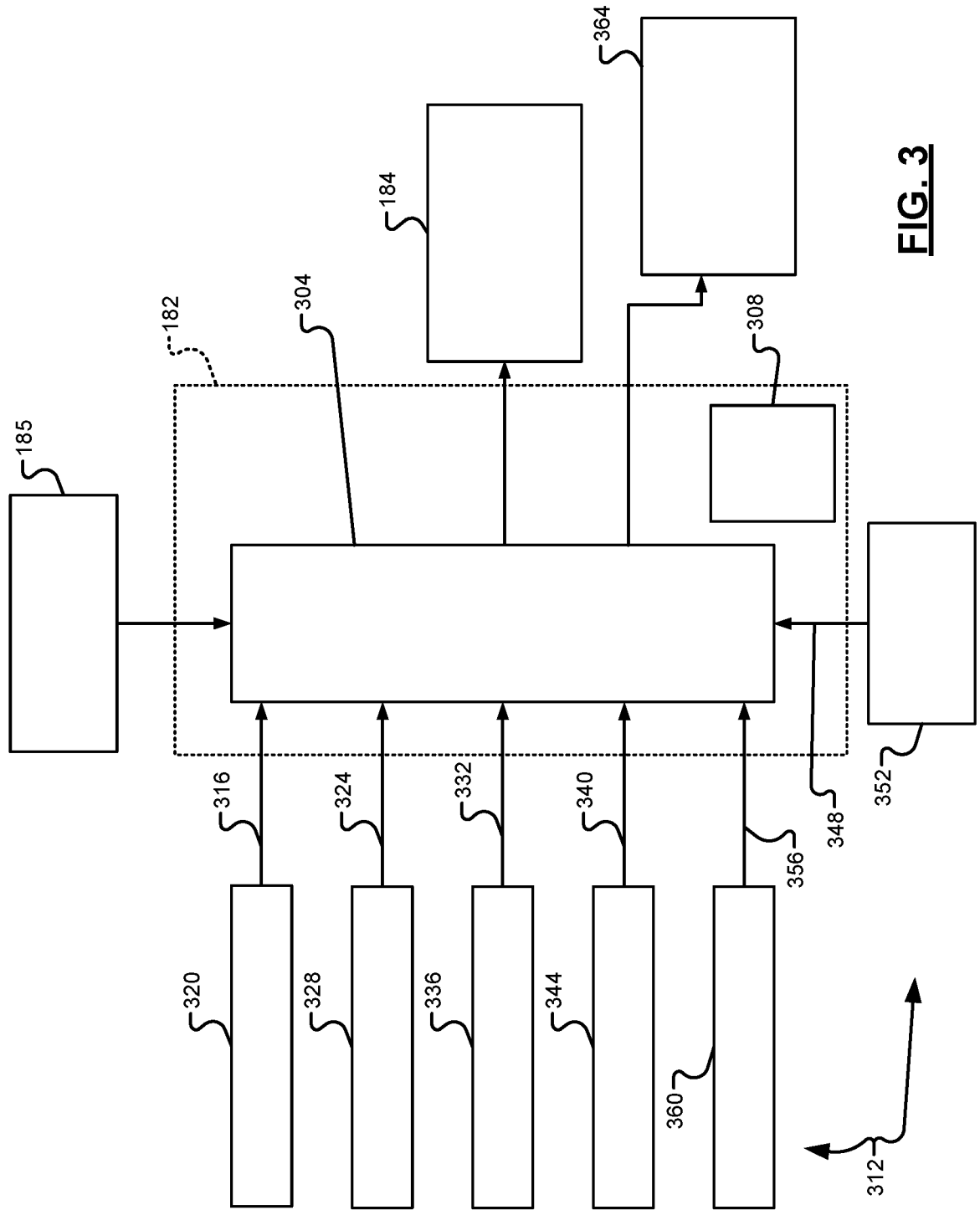
FIG. 3 is a functional block diagram of a gaming system.

FIG. 3 is a functional block diagram of an example gaming system. The gaming module 182 includes a processor module 304 including one or more processors. The processor module 304 executes one or more games 308, such as games stored in memory, to control gameplay. Each of the games 308 is an application executable by the processor module 304. Each of the games 308 may include an avatar navigating a virtual environment. The processor module 304 may determine which game to execute for gameplay (e.g., the avatar traversing the virtual environment) based on user input from one or more of the input devices 185.

The processor module 304 manipulates gameplay based on the environment of the vehicle and conditions around the vehicle. This couples the real world environment of the vehicle with the virtual environment of the game. Examples of environmental conditions include, for example, acceleration/jerk of the vehicle (e.g., due to road conditions), swerving to miss obstacles, outside weather conditions, etc.

The present application involves coupling the current vehicle environment as the vehicle is moving through changing conditions such as pot holes, rain, fog, high heat conditions, earthquake tremors, etc. so as to instantaneously change the state of an in-vehicle game by integrating the current conditions into the game. The processor module 304 receives conditions from sensors 312 of the vehicle to change the state of the game while it is being played.

Examples of the sensors 312 include, but are not limited to, global positioning system (GPS) data 316 (e.g., latitude, longitude, elevation, heading) from a GPS module 320 of the vehicle, inertia data 324 (e.g., velocity, acceleration, jerk) from an inertia module 328 of the vehicle, camera data 332 from one more cameras 336 of the vehicle, ambient temperature data 340 around the vehicle measured using an ambient temperature sensor 344, weather data 348 from one or more weather modules 352 (e.g., from the National Oceanic and Atmospheric Administration (NOAA), United States Geological Survey (USGS) agency, etc.), and other data 356 from one or more other data sources 360 of the vehicle. The weather modules 352 may obtain the weather data 348 from one or more remote sources (e.g., NOAA, USGS, etc.) via one or more networks based on the GPS data 316.

The vehicle also includes a heating, ventilation, and air conditioning (HVAC) system 364 that controls heating and cooling of a passenger cabin of the vehicle. Passengers/users sit within the passenger cabin of the vehicle. The gaming module 182 may control the HVAC system 364 based on the weather data 348 in various implementations. For example, the gaming module 182 may increase a speed of a blower of the HVAC system 364 when the weather data 348 indicates that a wind speed at the location of the vehicle is greater than a predetermined speed (e.g., 10 miles per hour) and/or that a high wind speed event is near the vehicle (e.g., a tornado or a hurricane).

Figure 4:
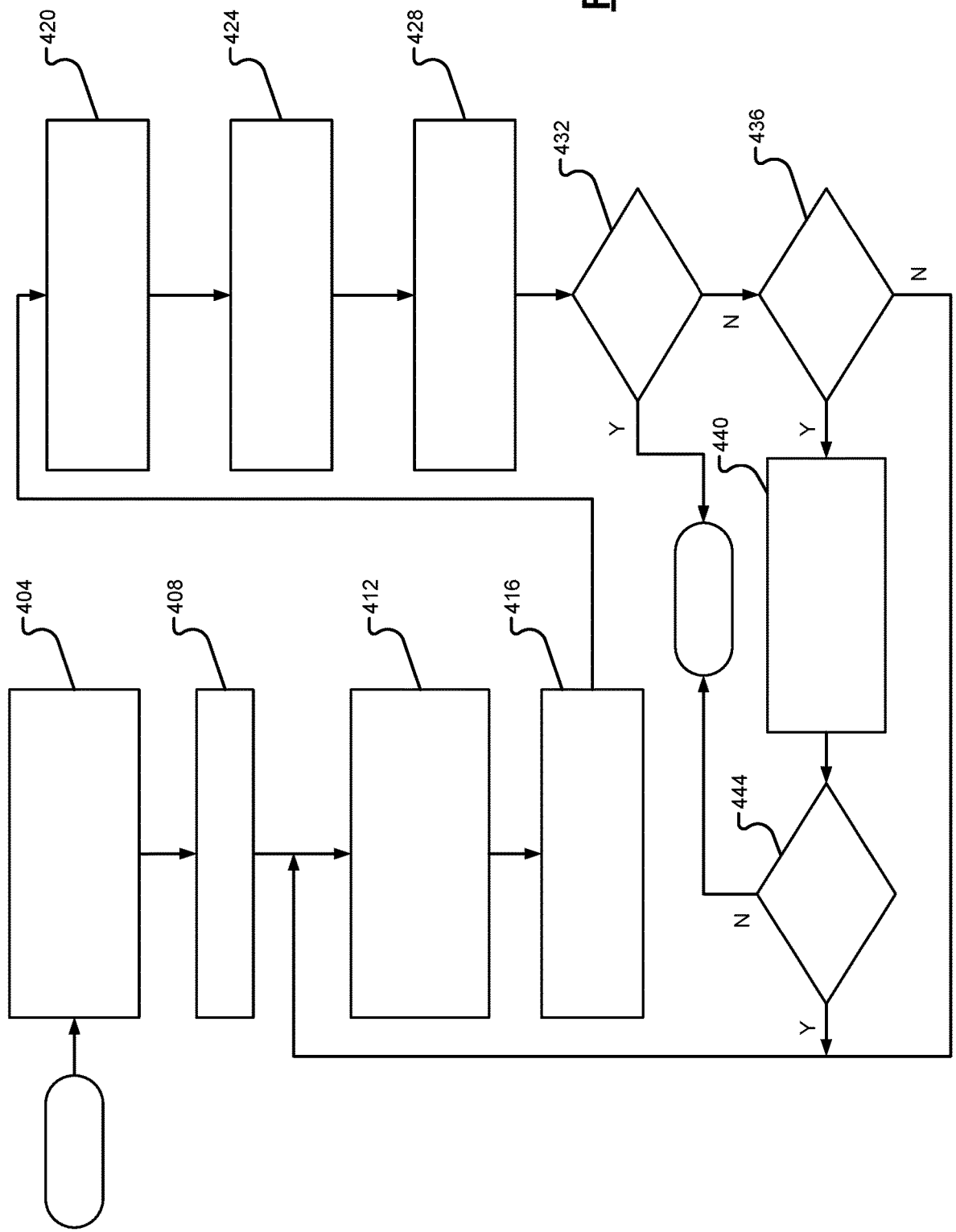
FIG. 4 is a flowchart depicting an example method of adjusting the virtual environment of a game based on conditions around the vehicle.

FIG. 4 is a flowchart depicting an example method of adjusting the virtual environment of a game based on conditions around the vehicle. Control begins with 404 where the gaming module 182 creates a virtual world for a game 308, for example, based on a navigation route of the vehicle. The navigation route of the vehicle may be received from an external source (e.g., a route server), such as in the example of an autonomous vehicle, or based on the location and heading of the vehicle from the GPS module 320. The gaming module 182 may create the virtual world additionally based on user preferences, such as user preferred location and/or landscaping. The user preferences may be stored in memory. The gaming module 182 may create the virtual world additionally based on a predetermined scalar value. The predetermined scalar value may relate to a speed through the virtual world relative to the speed of the vehicle and may be stored in memory. For example, the predetermined scalar value may be 2 (or another predetermined value) such that the speed through the virtual world is twice (two times) the actual speed of the vehicle.

At 408, the gaming module 182 starts the game 308. At 412, the gaming module 182 obtains the current GPS data 316 of the vehicle and updates a position and orientation of an avatar in the virtual world based on the current GPS data 316. At 416, the gaming module 182 obtains user input, if any, via the one or more input devices 185. The gaming module 182 adjusts the avatar in the virtual world of the game 308 based on the user input, if any.

At 420, the gaming module 182 obtains data from the sensors 312, such as the ambient temperature 340, sound information (e.g., from one or more microphones of the vehicle), the inertia data 324, etc. The microphones may be considered input devices 185 and the output of the input devices may include the sound information. At 424, the gaming module 182 obtains local information (e.g., weather) around the vehicle, such as from the weather modules 352.

At 428, the gaming module 182 updates the virtual environment based on the data received at 420 and 424. For example, the gaming module 182 may cause rain to appear within the virtual environment when there is rain at the location of the vehicle (as indicated in the weather data 348). Other examples of adjustments to the virtual environment are discussed further below.

At 432, the gaming module 182 determines whether the game 308 has ended. For example, the gaming module 182 may determine whether a predetermined end of the game 308 has been reached, the avatar of the user has perished, etc. If 432 is true, then control may end. If 432 is false, then control may continue with 436.

At 436, the gaming module 182 determines whether the trip of the vehicle is complete. For example, the gaming module 182 may determine whether the vehicle has transitioned to park, the location of the vehicle has reached a destination (e.g., a predetermined home or work location), or an end of the navigation route at 436. The position 174 of the PRNDL may indicate whether the vehicle (transmission) is in park. If 436 is true, then control may transfer to 440. If 436 is false, then control may return to 412.

At 440, the gaming module 182 prompts the user to provide input regarding whether the user would like to continue playing the game 308. For example, the gaming module 182 may visibly or audibly output the prompt to the user. At 444, the gaming module 182 determines whether the user would like to continue the game based on user input received via the one or more input devices 185 in response to the prompt. If 444 is false, then control may end. If 444 is true, then control returns to 412.

Figure 5:
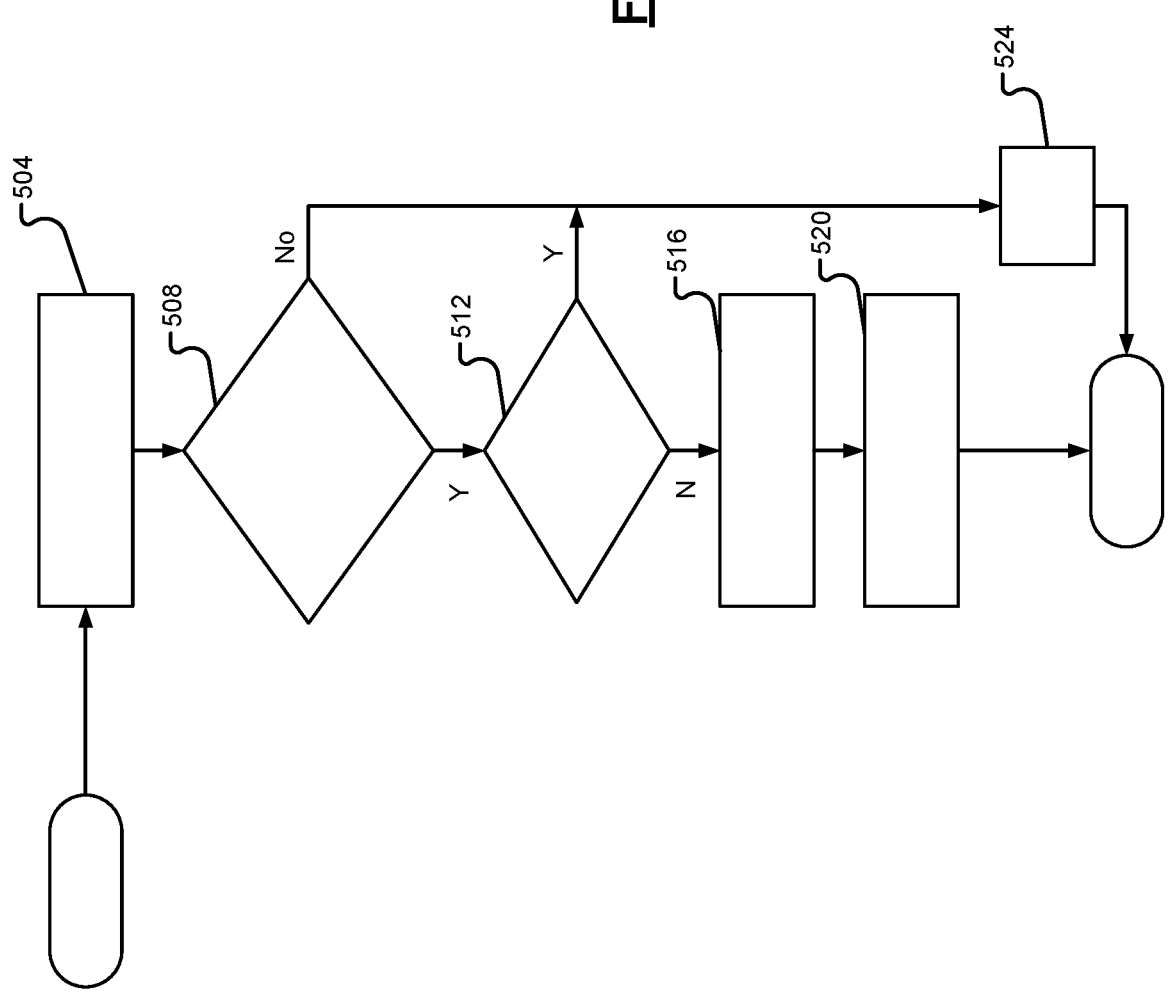
FIGS. 5-8 are flowcharts depicting example methods of updating the virtual gaming environment based on a condition of the vehicle.

FIG. 5 is a flowchart depicting an example method of updating the virtual gaming environment based on a condition of the vehicle. The example of FIG. 5 may take place as part of 420-428 of FIG. 4.

Control begins with 504 after 416. At 504, the gaming module 182 obtains the inertia data 324 (e.g., including velocity, acceleration, and jerk) from the inertia module 328. At 508, the gaming module 182 determines whether the jerk is greater than a predetermined jerk ($J_{max}$). The predetermined jerk is greater than zero and may be calibratable. If 508 is true, then control continues with 512. If 508 is false, then the gaming module 182 may not adjust the virtual environment of the game 308 based on the jerk of the vehicle (i.e., do nothing based on the jerk) at 524, and control may continue with 432. While the gaming module 182 may not adjust the virtual environment based on the jerk, the gaming module 182 may adjust the virtual environment of the game 308 based on one or more other conditions of the vehicle. The jerk may be greater than the predetermined jerk, for example, when one or more tires of the vehicle travel through a pothole, traverse a speed bump, and/or when one or more other events occur.

At 512, the gaming module 182 may determine whether shaking of buildings is disabled, such as in the user preferences stored in memory of the vehicle. If 512 is true, then the gaming module 182 may not adjust the virtual environment of the game 308 based on the jerk of the vehicle (i.e., do nothing based on the jerk) at 524, and control may continue with 432. If 512 is false, then control may continue with 516.

At 516, the gaming module 182 may shake one, more than one, or all buildings (or other objects) surrounding an avatar of the user in the virtual environment (e.g., within a predetermined radius of the avatar). The gaming module 182 may determine a level (e.g., amplitude) of the shaking based on the jerk. For example, the gaming module 182 may increase shaking as the jerk increases and vice versa. The gaming module 182 may shake all of the buildings for a predetermined period, such as 1-2 seconds or another suitable period. At 520, the gaming module 182 may disable building shaking for a second predetermined period (T). The second predetermined period may be the same as or different than the predetermined period. The second predetermined period may be, for example, 1-2 seconds or another suitable period. Control continues with 432.

Figure 6:
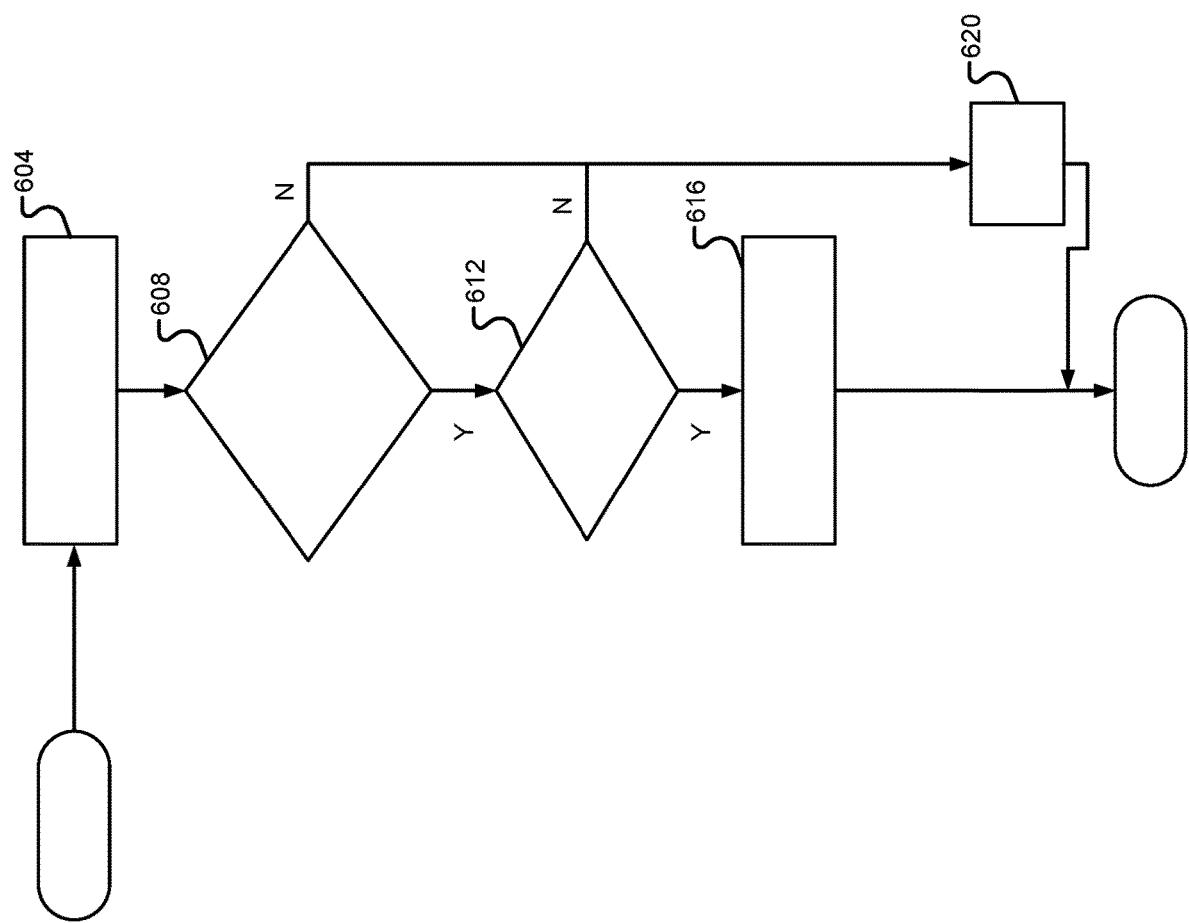

FIG. 6 is a flowchart depicting an example method of updating the virtual gaming environment based on a condition of the vehicle. The example of FIG. 6 may take place as part of 420-428 of FIG. 4. The example of FIG. 6 may be executed concurrently with the example of FIG. 5.

Control begins with 604 after 416. At 604, the gaming module 182 obtains the ambient temperature 340 outside of the vehicle from the ambient temperature sensor 344. At 608, the gaming module 182 determines whether the ambient temperature 340 is greater than a predetermined temperature ($T_{max}$). The predetermined temperature is greater than zero and may be calibratable. For example only, the predetermined temperature may be approximately 90 degrees Fahrenheit or another suitable temperature. If 608 is true, then control continues with 612. If 608 is false, then the gaming module 182 may not adjust the virtual environment of the game 308 based on the ambient temperature 340 at 620, and control may continue with 432. While the gaming module 182 may not adjust the virtual environment based on the ambient temperature 340, the gaming module 182 may adjust the virtual environment of the game 308 based on one or more other conditions of the vehicle.

At 612, the gaming module 182 may determine whether generation of a visual mirage effect is enabled, such as in the user preferences stored in memory of the vehicle. If 612 is false, then the gaming module 182 may not adjust the virtual environment of the game 308 based on the ambient temperature 340 (i.e., do nothing based on the ambient temperature) at 620, and control may continue with 432. If 612 is true, then control may continue with 616.

At 616, the gaming module 182 may visually apply a mirage effect to the virtual environment of the game. The mirage effect may include, for example, bending light rays from a light source of the virtual environment to produce a displaced image of distant objects in the virtual environment and/or the sky of the virtual environment. Additionally or alternatively, the gaming module 182 may cause one or more items to melt in the virtual environment when the ambient temperature 340 is greater than a predetermined temperature or to freeze when the ambient temperature 340 is less than a predetermined temperature. Control continues with 432.

Figure 7:
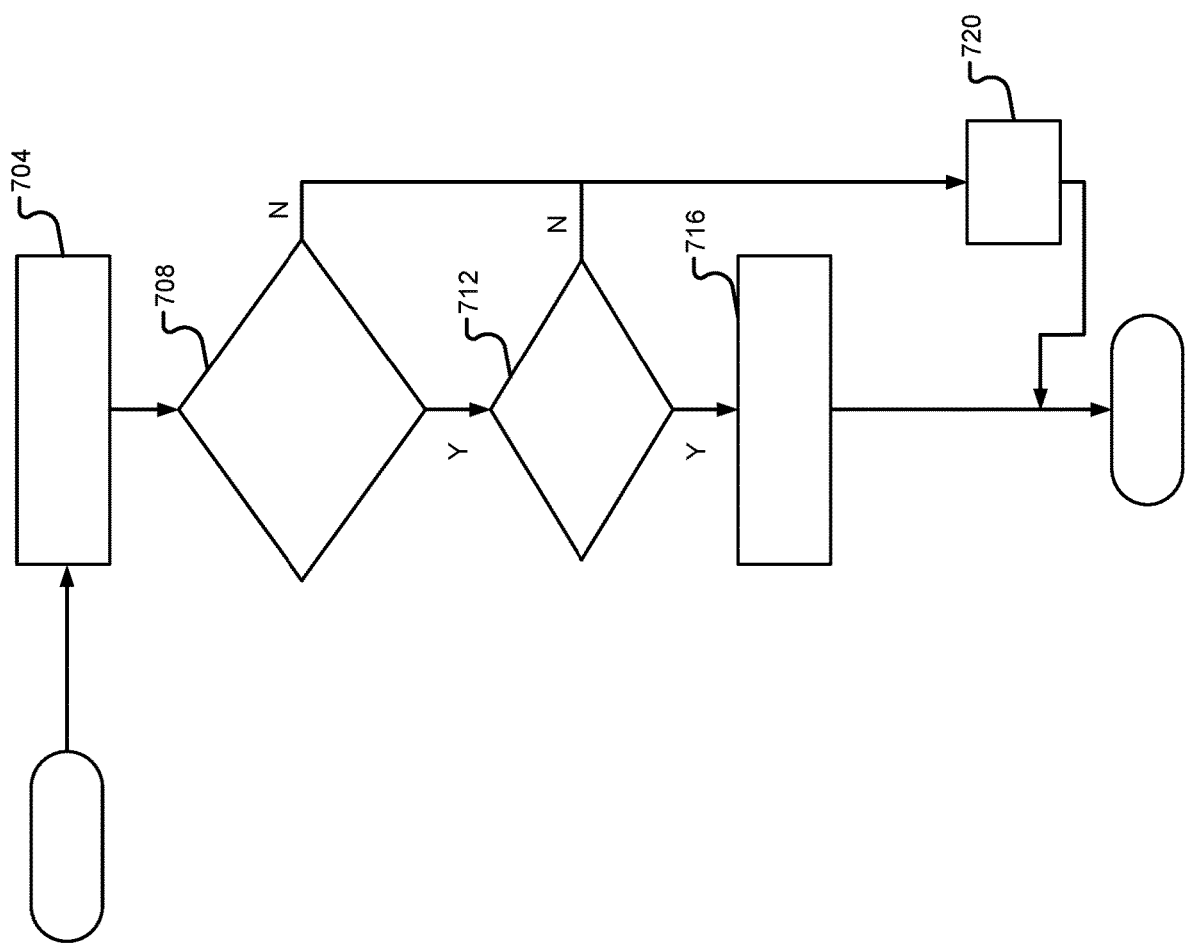

FIG. 7 is a flowchart depicting an example method of updating the virtual gaming environment based on a condition of the vehicle. The example of FIG. 7 may take place as part of 420-428 of FIG. 4. The example of FIG. 7 may be executed concurrently with the examples of FIGS. 5 and 6.

Control begins with 704 after 416. At 704, the gaming module 182 obtains the weather data 348 regarding current weather conditions around the vehicle. At 708, the gaming module 182 determines whether one or more instances of thunder have been captured around the vehicle, such as whether the weather data 348 reflects the occurrence of one or more instances of thunder within the last predetermined period (e.g., 15 minutes) before the present time. Additionally or alternatively, the gaming module 182 may determine whether one or more instances of thunder have been captured by one or more microphones of the vehicle. If 708 is true, then control continues with 712. If 708 is false, then the gaming module 182 may not adjust the virtual environment of the game 308 based on whether thunder has occurred at 720, and control may continue with 432. While the gaming module 182 may not adjust the virtual environment based on whether thunder occurred, the gaming module 182 may adjust the virtual environment of the game 308 based on other information in the weather data 348 and/or one or more other conditions of the vehicle. While the example of thunder is provided, the present application is also applicable to atmospheric electric discharges or lightning. Atmospheric electric discharges may be identified, for example, in one or more images, in the weather data 348, of in another suitable manner.

At 712, the gaming module 182 may determine whether generation of an (e.g., audible) thunder effect is enabled, such as in the user preferences stored in memory of the vehicle. If 712 is false, then the gaming module 182 may not audibly generate an audible instance of thunder in the virtual environment of the game 308 (i.e., do nothing based on whether thunder occurred) at 720, and control may continue with 432. If 712 is true, then control may continue with 716.

At 716, the gaming module 182 may generate an instance of thunder in the virtual environment of the game 308. For example, the gaming module 182 may audibly generate a predetermined thunder sound in the gaming environment to be output via one or more speakers at 716. Additionally or alternatively, the gaming module 182 may visually adjust the virtual environment of the game 308 to include an instance of thunder. For example, the gaming module 182 may shake the virtual environment a predetermined amount for a predetermined period to include an instance of thunder. Control continues with 432.

Figure 8:
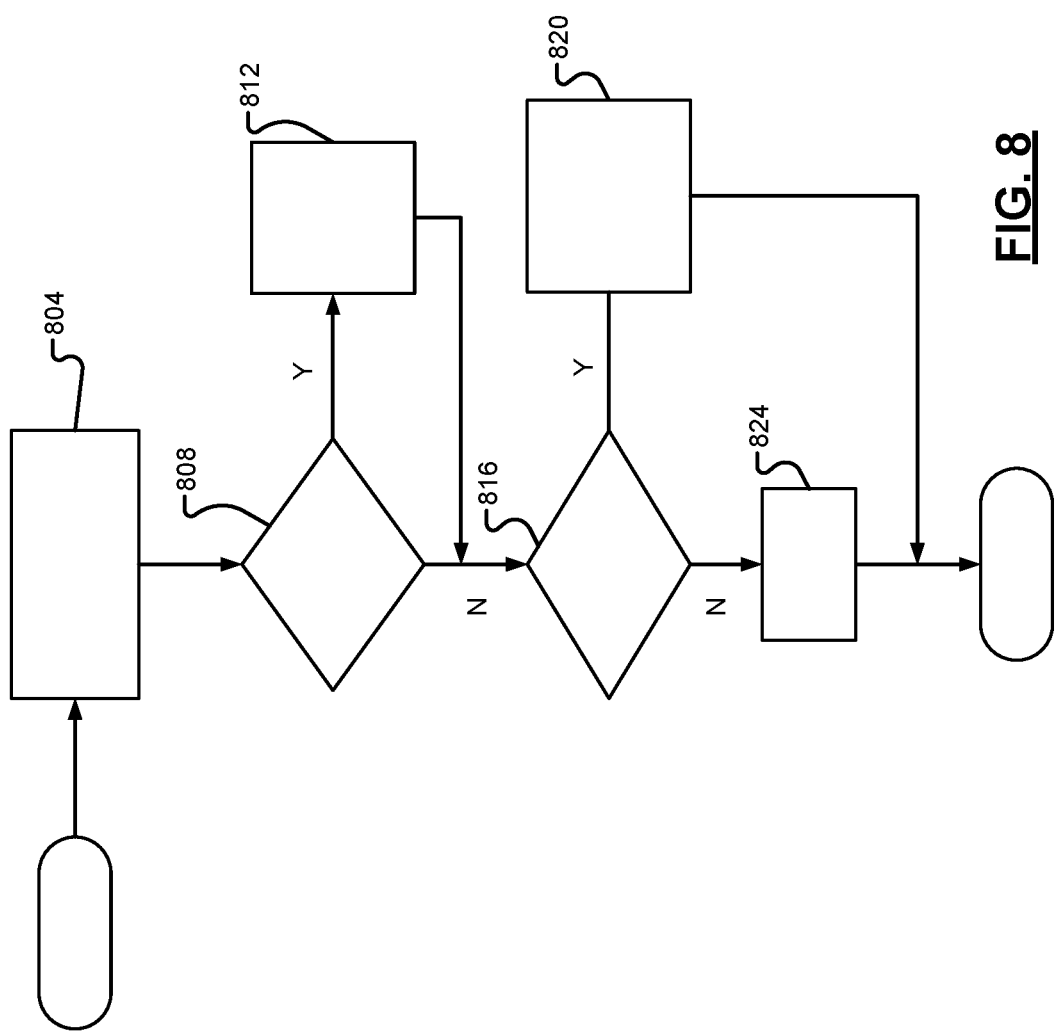

FIG. 8 is a flowchart depicting an example method of updating the virtual gaming environment based on a condition of the vehicle. The example of FIG. 8 may take place as part of 420-428 of FIG. 4. The example of FIG. 8 may be executed concurrently with the examples of FIGS. 5, 6, and 7.

Control begins with 804 after 416. At 804, the gaming module 182 determines whether one or more emergency vehicles are located within a predetermined distance of the vehicle in the real world. The gaming module 182 may determine whether one or more emergency vehicles are located within the predetermined distance of the vehicle, for example, using images captured using one or more of the external sensors and cameras 186 or in another suitable manner. At 808, the gaming module 182 determines whether an ambulance is located within the predetermined distance of the vehicle. If 808 is true, then control continues with 812. If 808 is false, then control may continue with 816. At 812, the gaming module 182 may increase a health of the avatar in the virtual environment and control may continue with 816. The gaming module 182 may increase the health of the avatar by a predetermined amount or to a predetermined full health value (e.g., 100 percent health).

At 816, the gaming module 182 determines whether a police vehicle is located within the predetermined distance of the vehicle. If 816 is true, then the gaming module 182 takes one or more actions in the virtual environment at 820, such as causing one or more adversarial characters in the virtual environment to perish (e.g., decrease health values to zero). Control may continue with 432, as discussed above. If 816 is false, then control may continue with 824. At 824, the gaming module 182 may not adjust the virtual environment based on whether an ambulance and/or a police vehicle is within the predetermined distance of the vehicle. Control may continue with 432. While the gaming module 182 may not adjust the virtual environment based on whether an ambulance and/or a police vehicle is within the predetermined distance of the vehicle, the gaming module 182 may adjust the virtual environment of the game 308 based on one or more other conditions of the vehicle.

Figure 9:
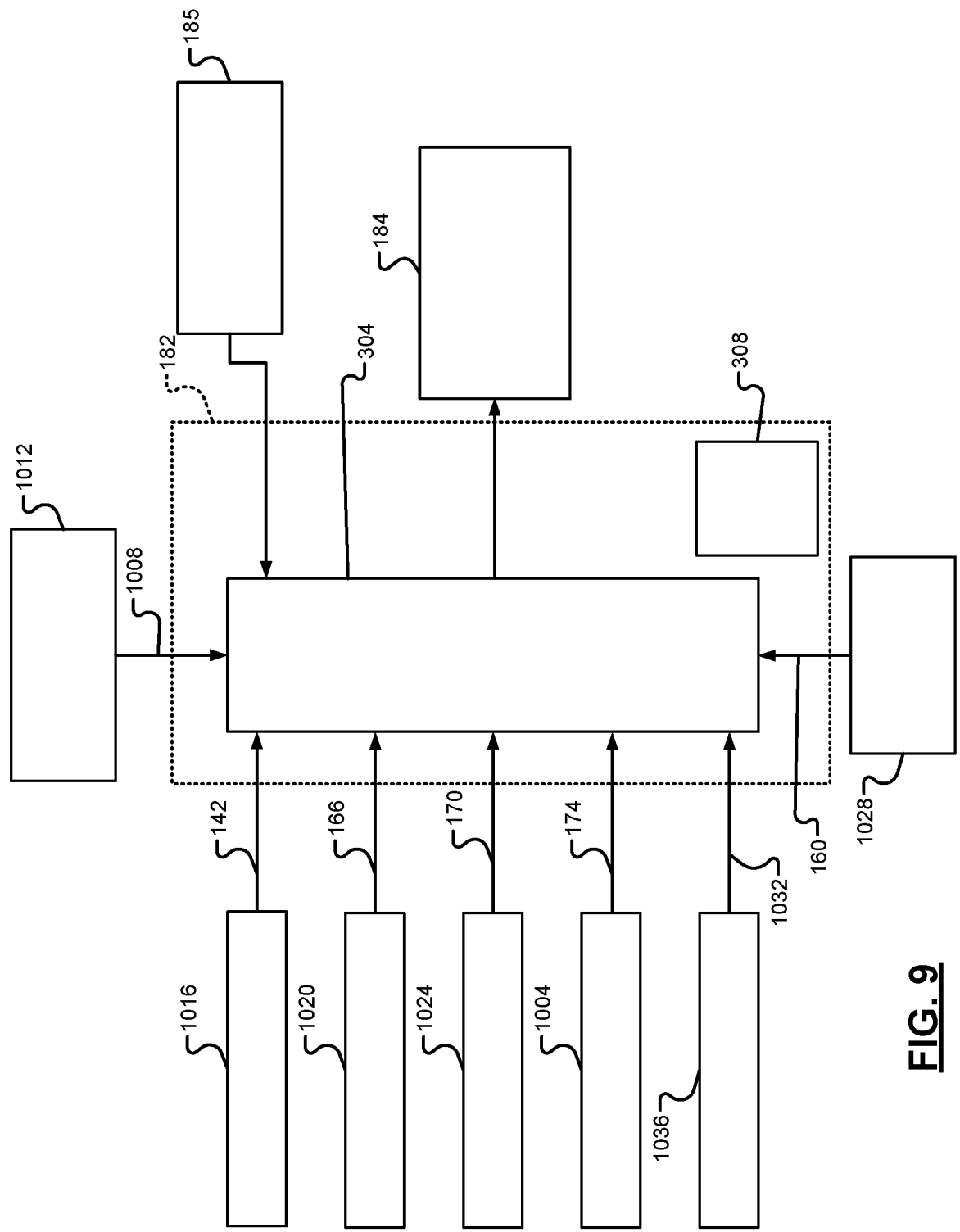
FIG. 9 includes a functional block diagram of the example gaming system of FIG. 3 including additional inputs.

FIG. 9 includes a functional block diagram of the example gaming system of FIG. 3 including additional inputs. FIG. 10 includes a flowchart depicting an example method of controlling play of a game 308 while the vehicle is parked.

Referring now to FIGS. 9 and 10, control begins with 1104 (FIG. 10) where the vehicle is stopped (e.g., vehicle speed=0) and parked. The gaming module 182 may determine that the vehicle is parked, for example, when the position 174 of the PRNDL measured by a PRNDL sensor 1004 indicates the park mode and/or when a parking brake signal 1008 from a parking brake sensor 1012 indicates that a parking brake of the vehicle is applied. At 1108 (FIG. 10), the gaming module 182 transitions a game mode to ON to allow for playing of the game 308.

At 1112 (FIG. 10), the gaming module 182 transitions functionality of vehicle inputs from the real world to the virtual environment. For example, in the real world, the steering control module 140 may control steering based on the SWA 142 measured by a SWA sensor 1016. Propulsion (including acceleration and deceleration) of the vehicle may be controlled based on the APP 166 measured by an APP sensor 1020 and/or the BPP 170 measured using a BPP sensor 1024. Application of power to the horn 158 may be controlled based on the horn input 160 from a horn input device 1028. In the virtual environment, the gaming module 182 controls steering of the avatar of the user based on the SWA 142 measured by the SWA sensor 1016. The gaming module 182 controls propulsion (including acceleration, deceleration, and jerk) of the avatar based on the APP 166 measured by the APP sensor 1020 and/or the BPP 170 measured using the BPP sensor 1024. The gaming module 182 controls output of a predetermined horn sound in the virtual environment based on the horn input 160 from the horn input device 1028. The gaming module 182 may control other aspects of the virtual environment based on other inputs 1032 from other input devices 1036.

At 1116 (FIG. 10), the gaming module 182 establishes connections with the vehicle inputs. The gaming module 182 may also establish an internet connection, such as via a WiFi transceiver of the vehicle, a cellular transceiver of the vehicle, or a satellite transceiver of the vehicle. The gaming module 182 may also obtain the user preferences, such as from the memory, at 1120.

At 1124 (FIG. 10), the gaming module 182 starts the game 308. While the game 308 is being played, the gaming module 182 controls gameplay and actions taken in the virtual environment based on signals from the vehicle inputs. The respective control modules do not control the associated vehicle components in the real world. For example, the horn module 156 does not apply power to the horn 158 based on the horn input 160 from the horn input device 1028. The steering control module 140 does not control steering based on the SWA 142. Propulsion (including acceleration, deceleration, and jerk) is not controlled based on the APP 166. Application of the brakes 154 is not controlled based on the BPP 170.

At 1128, the gaming module 182 determines whether a toggle input has been received from a toggle input device (e.g., a button or switch, such as an ignition button or switch). The toggle input device may be one of the other input devices 1036. The toggle input may be received in response to user actuation of the toggle input device. If 1128 is false, then the gaming module 182 may continue playing of the game 308. If 1128 is true, then the gaming module 182 pauses the game 308 at 1136, and control continues with 1140.

While the game is paused, the gaming module 182 transfers functionality of some of the vehicle inputs from the virtual environment to the real world at 1140. For example, the gaming module 182 may transfer functionality of the horn 158 to the real world. The horn module 156 then applies power to the horn 158 based on the horn input 160 from the horn input device 1028. Additionally or alternatively, the gaming module may transfer functionality of one or more of the displays to the real world. The gaming module 182 may then display video from one or more of the external cameras on those one or more displays, display video from outside of the vehicle on those one or more displays, etc. This may allow a user to monitor surroundings of the vehicle during gameplay.

At 1144 (FIG. 10), the gaming module 182 determines whether to stop the game 308. For example, the gaming module 182 may determine whether a predetermined period since gameplay began has passed, whether user input to stop the game 308 has been received, etc. If 1144 is false, then the gaming module 182 may continue playing of the game 308 and remain at 1144 or 1128. If 1144 is true, then control continues with 1148. At 1148, the gaming module 182 transfers functionality of (all of) the vehicle inputs from the virtual environment to the real world. For example, in the real world, the steering control module 140 may control steering based on the SWA 142 measured by a SWA sensor 1016. Propulsion (including acceleration, deceleration, and jerk) of the vehicle may be controlled based on the APP 166 measured by an APP sensor 1020 and/or the BPP 170 measured using a BPP sensor 1024. The horn module 156 may control application of power to the horn 158 based on the horn input 160 from the horn input device 1028.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A gaming system of a vehicle, comprising:
a game application embodying an interactive game and stored in memory;
a sensor of a vehicle configured to determine a present condition while the vehicle is moving;
a gaming module of the vehicle, the gaming module configured to, while the vehicle is moving:
execute the game application;
display a virtual environment of the interactive game via one or more displays in the vehicle;
output sound of the interactive game via one or more speakers in the vehicle;
control action within the virtual environment of the interactive game based on user input received via one or more input devices of the vehicle;
adjust one or more characteristics of the virtual environment of the interactive game based on the present condition; and
move an avatar through the virtual environment of the interactive game based on a predetermined scalar value multiplied by a velocity of the vehicle, wherein the predetermined scalar value is greater than 1,
wherein the sensor includes a global positioning system (GPS) module of the vehicle configured to determine a present location of the vehicle;
a weather module configured to obtain weather data indicative of weather conditions at the vehicle based on the present location of the vehicle, the weather data including a wind speed at the present location of the vehicle; and
a heating ventilation and air conditioning (HVAC) system configured to control heating and cooling of a passenger cabin of the vehicle,
wherein the gaming module is further configured to:
adjust a speed of a blower of the HVAC system based on the wind speed of the weather data; and
adjust one or more characteristics of the virtual environment of the interactive game based on the wind speed of the weather data.

2. The gaming system of claim 1 wherein the gaming module is configured to, while the vehicle is moving, adjust the virtual environment of the interactive game based on the present location of the vehicle.

3. The gaming system of claim 1 wherein the gaming module is configured to adjust weather in the virtual environment of the interactive game based on the weather data indicative of weather conditions at the vehicle.

4. The gaming system of claim 1 wherein the weather module is configured to obtain the weather data from a remote weather source via a network.

5. The gaming system of claim 1 wherein the gaming module is configured to increase a speed of the blower of the HVAC system when the wind speed is greater than a predetermined speed.

6. The gaming system of claim 1 further comprising a second sensor configured to measure a jerk of the vehicle, wherein the gaming module is configured to adjust one or more characteristics of the virtual environment of the interactive game based on the jerk of the vehicle.

7. The gaming system of claim 6 wherein the gaming module is configured to shake one or more items of the virtual environment in response to a determination that the jerk of the vehicle is greater than a predetermined jerk.

8. The gaming system of claim 1 further comprising a second sensor configured to measure an ambient temperature outside of the vehicle,
wherein the gaming module is configured to adjust one or more characteristics of the virtual environment of the interactive game based on the ambient temperature outside of the vehicle.

9. The gaming system of claim 8 wherein the gaming module is configured to adjust at least one light characteristic within the virtual environment in response to a determination that the ambient temperature outside of the vehicle is greater than a predetermined temperature.

10. The gaming system of claim 8 wherein the gaming module is configured to cause one or more items to visibly melt in the virtual environment in response to a determination that the ambient temperature outside of the vehicle is greater than a predetermined temperature.

11. The gaming system of claim 8 wherein the gaming module is configured to cause one or more items to visibly transition to a frozen state in the virtual environment in response to a determination that the ambient temperature outside of the vehicle is less than a predetermined temperature.

12. The gaming system of claim 1 further comprising a second sensor configured to capture an image of an environment outside of the vehicle, wherein the gaming module is configured to adjust one or more characteristics of the virtual environment based on the image of the environment outside of the vehicle.

13. A gaming system of a vehicle, comprising:
a game application embodying an interactive game and stored in memory;
a gaming module of the vehicle, the gaming module configured to, in response to a determination that the vehicle is stopped and parked:
execute the game application;
display a first virtual environment of the interactive game via a display in the vehicle; and
control action within the first virtual environment of the interactive game based on input received via at least one of:
a steering wheel of the vehicle;
a horn input device of the vehicle;
an accelerator pedal of the vehicle; and
a brake pedal of the vehicle; and
a sensor of a vehicle configured to determine a present condition while the vehicle is moving,
wherein, the gaming module is further configured to, while the vehicle is moving:
execute the game application;
display a second virtual environment of the interactive game via one or more displays in the vehicle;
output sound of the interactive game via one or more speakers in the vehicle;
control action within the second virtual environment of the interactive game based on user input received via one or more input devices of the vehicle; and
adjust one or more characteristics of the second virtual environment of the interactive game based on the present condition,
wherein the sensor includes a global positioning system (GPS) module of the vehicle configured to determine a present location of the vehicle;
a weather module configured to obtain weather data indicative of weather conditions at the vehicle based on the present location of the vehicle, the weather data including a wind speed at the present location of the vehicle; and
a heating ventilation and air conditioning (HVAC) system configured to control heating and cooling of a passenger cabin of the vehicle,
wherein the gaming module is further configured to:
adjust a speed of a blower of the HVAC system based on the wind speed of the weather data;
adjust one or more characteristics of at least one of the first and second virtual environments of the interactive game based on the wind speed of the weather data; and
move an avatar through the second virtual environment of the interactive game based on a predetermined scalar value multiplied by a velocity of the vehicle, wherein the predetermined scalar value is greater than 1.

14. The gaming system of claim 13 wherein the gaming module is configured to, in response to the determination that the vehicle is stopped and parked, control action within the first virtual environment of the interactive game based on input received via all of:
the steering wheel of the vehicle;
the horn input device of the vehicle;
the accelerator pedal of the vehicle; and
the brake pedal of the vehicle.

15. The gaming system of claim 13 wherein the gaming module is configured to, in response to the determination that the vehicle is stopped and parked, at least one of:
move an avatar left and right within the first virtual environment of the interactive game in response to turning of the steering wheel of the vehicle left and right, respectively; and
move the avatar upwardly and downwardly within the first virtual environment of the interactive game in response to turning of the steering wheel.

16. The gaming system of claim 13 wherein the gaming module is configured to, in response to the determination that the vehicle is stopped and parked, accelerate movement of an avatar in the first virtual environment of the interactive game in response to actuation of the accelerator pedal of the vehicle.

17. The gaming system of claim 13 wherein the gaming module is configured to, in response to the determination that the vehicle is stopped and parked, decelerate movement of an avatar in the first virtual environment of the interactive game in response to actuation of the brake pedal of the vehicle.

18. A gaming system of a vehicle, comprising:
a game application embodying an interactive game and stored in memory;
a first sensor of a vehicle configured to determine a present condition while the vehicle is moving;
a gaming module of the vehicle, the gaming module configured to, while the vehicle is moving:
execute the game application;
display a virtual environment of the interactive game via one or more displays in the vehicle;
output sound of the interactive game via one or more speakers in the vehicle;
control action within the virtual environment of the interactive game based on user input received via one or more input devices of the vehicle; and
adjust one or more characteristics of the virtual environment of the interactive game based on the present condition,
wherein the first sensor includes a global positioning system (GPS) module of the vehicle configured to determine a present location of the vehicle;
a weather module configured to obtain weather data indicative of weather conditions at the vehicle based on the present location of the vehicle, the weather data including a wind speed at the present location of the vehicle;
a heating ventilation and air conditioning (HVAC) system configured to control heating and cooling of a passenger cabin of the vehicle,
wherein the gaming module is further configured to:
adjust a speed of a blower of the HVAC system based on the wind speed of the weather data; and
adjust one or more characteristics of the virtual environment of the interactive game based on the wind speed of the weather data; and
a second sensor configured to measure an ambient temperature outside of the vehicle,
wherein the gaming module is configured to cause one or more items to visibly melt in the virtual environment in response to a determination that the ambient temperature outside of the vehicle is greater than a predetermined temperature, and
wherein the gaming module is configured to cause one or more items to visibly transition to a frozen state in the virtual environment in response to a determination that the ambient temperature outside of the vehicle is less than a predetermined temperature.

* * * * *